US010991004B2

(12) United States Patent
Soni et al.

(10) Patent No.: US 10,991,004 B2
(45) Date of Patent: Apr. 27, 2021

(54) UTILIZING POPULATION DENSITY TO FACILITATE PROVIDING OFFERS

(71) Applicant: ADOBE INC., San Jose, CA (US)

(72) Inventors: Sachin Soni, New Delhi (IN); Suryadeep Kumar Agrawal, Noida (IN); Walter W. Chang, San Jose, CA (US); Anmol Dhawan, Uttar Pradesh (IN); Ashish Duggal, Delhi (IN)

(73) Assignee: ADOBE INC., San Jose, CA (US)

( * ) Notice: Subject to any disclaimer, the term of this patent is extended or adjusted under 35 U.S.C. 154(b) by 950 days.

(21) Appl. No.: 14/812,805

(22) Filed: Jul. 29, 2015

(65) Prior Publication Data

US 2017/0032416 A1 Feb. 2, 2017

(51) Int. Cl.
*G06Q 30/00* (2012.01)
*G06Q 30/02* (2012.01)

(52) U.S. Cl.
CPC ............... *G06Q 30/0254* (2013.01)

(58) Field of Classification Search
CPC .................................................. G06Q 30/0254
See application file for complete search history.

(56) References Cited

U.S. PATENT DOCUMENTS

| | | | | |
|---|---|---|---|---|
| 8,922,590 B1* | 12/2014 | Luckett, Jr. | ........... | G09G 5/377 345/633 |
| 2003/0014213 A1* | 1/2003 | Yokota | .................. | G06Q 30/02 702/150 |
| 2005/0153713 A1* | 7/2005 | Sharony | ................ | H04W 64/00 455/456.5 |
| 2007/0244750 A1* | 10/2007 | Grannan | ................ | G06Q 30/02 705/14.64 |
| 2008/0214166 A1* | 9/2008 | Ramer | ................... | G06Q 30/02 455/414.3 |
| 2008/0306756 A1* | 12/2008 | Sorensen | ............... | G06Q 30/02 705/27.1 |
| 2009/0171808 A1* | 7/2009 | Tracey | .................. | G06Q 10/00 705/26.1 |
| 2013/0060640 A1* | 3/2013 | Gadhia | ............. | G06Q 30/0251 705/14.58 |
| 2014/0180848 A1* | 6/2014 | Argue | .................. | G07G 1/0036 705/16 |
| 2015/0317682 A1* | 11/2015 | Kayser | .............. | G01G 19/4144 705/14.55 |

OTHER PUBLICATIONS

Google search results from Google Scholar (google.com/scholar) based on search string "direct shopper to less crowded area", retrieved Oct. 2019, pp. 1-2.*

* cited by examiner

*Primary Examiner* — Scott C Anderson
(74) *Attorney, Agent, or Firm* — Shook, Hardy & Bacon, L.L.P.

(57) ABSTRACT

Computer-readable media, computer systems, and computing devices of a method for facilitating providing offers utilizing population densities are provided. In embodiments, a population density for a geographical space is determined based on locations of a plurality of user devices. The population density associated with the geographical space is used to determine to provide an electronic offer to a user. The electronic offer may be associated with an item in the geographical space to entice the user to move to the geographical space. In accordance with determining to provide an electronic offer to the user, the electronic offer is provided for viewing by the user via a user device.

20 Claims, 5 Drawing Sheets

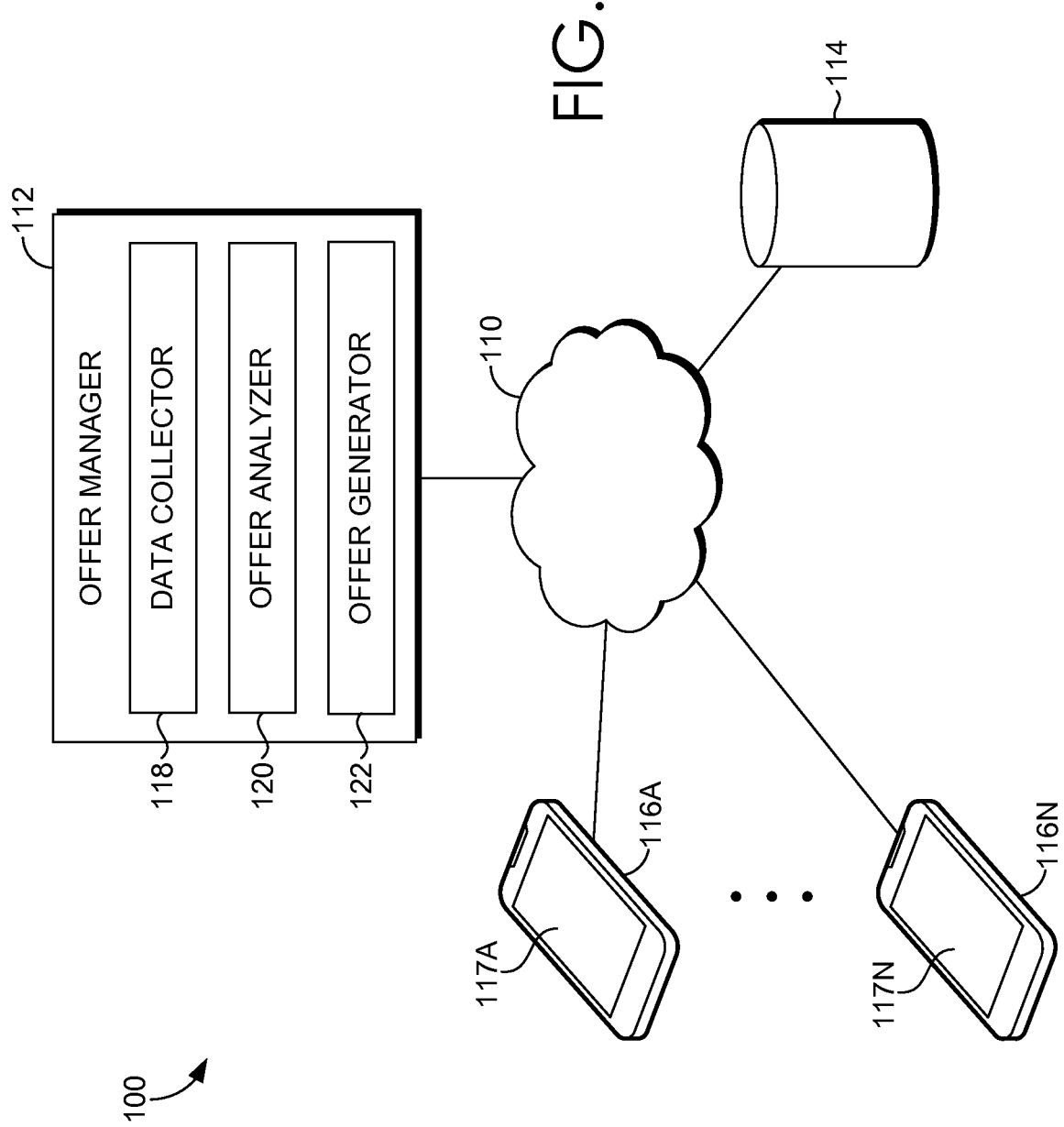

| 202 | Section (210) | Current Number of Customers (212) | Number of Low Purchase Probability Customers (214) | Number of Customers that can be Accomodated (216) |
|---|---|---|---|---|
| | Sports - Cycling | 20 | 12 | -2 (already 2 extra) |
| | Sports - Camping | 10 | 4 | 15 |
| | Electronics - Phone | 30 | 15 | -5 (already 5 extra) |
| | Electronics - Computers | 10 | 3 | 20 |
| | Furniture - Bedroom | 3 | 0 | 20 |
| | Furniture - Kitchen | 6 | 1 | 10 |

| | Customer ID (220) | Customer Interest (222) | Customer Location (224) | Customer Purchase Probability (226) | Section Accomodation Status (228) |
|---|---|---|---|---|---|
| 204 | 1 | Sports - Cycling | Entrance A | High (7/10) | Red (0) |
| | | Electronics - Computers | | High (7/10) | Green (20) |
| | 2 | Furniture - Bedroom | Entrance C | High (6/10) | Green (20) |
| | 3 (Premium Customer) | Electronics - Phone | Entrance B | High (9/10) | Red (-5) |

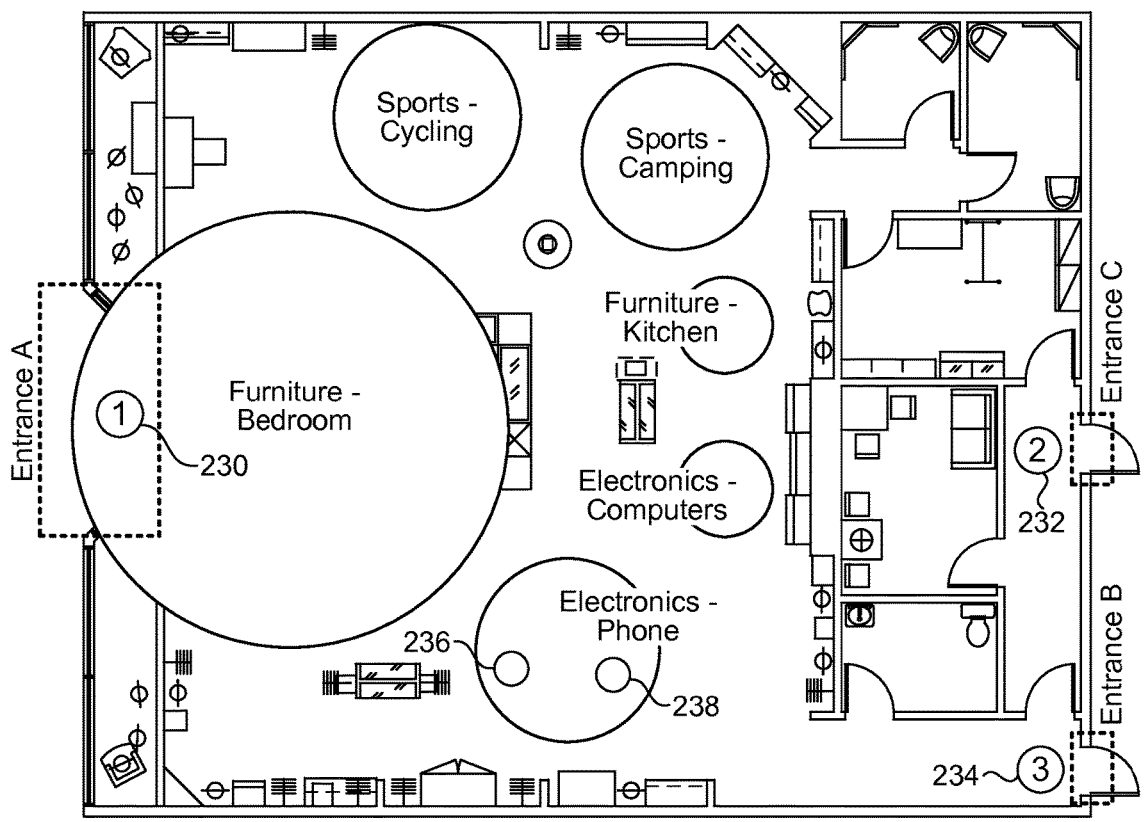

FIG. 2

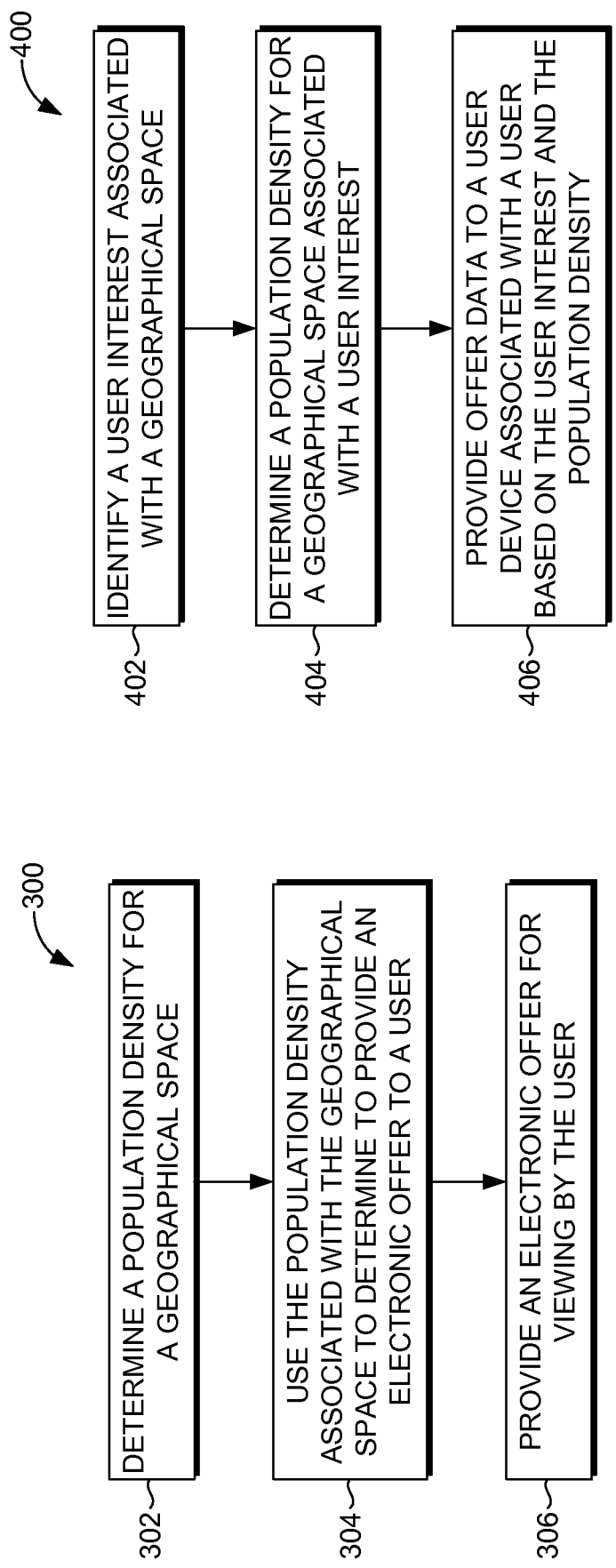

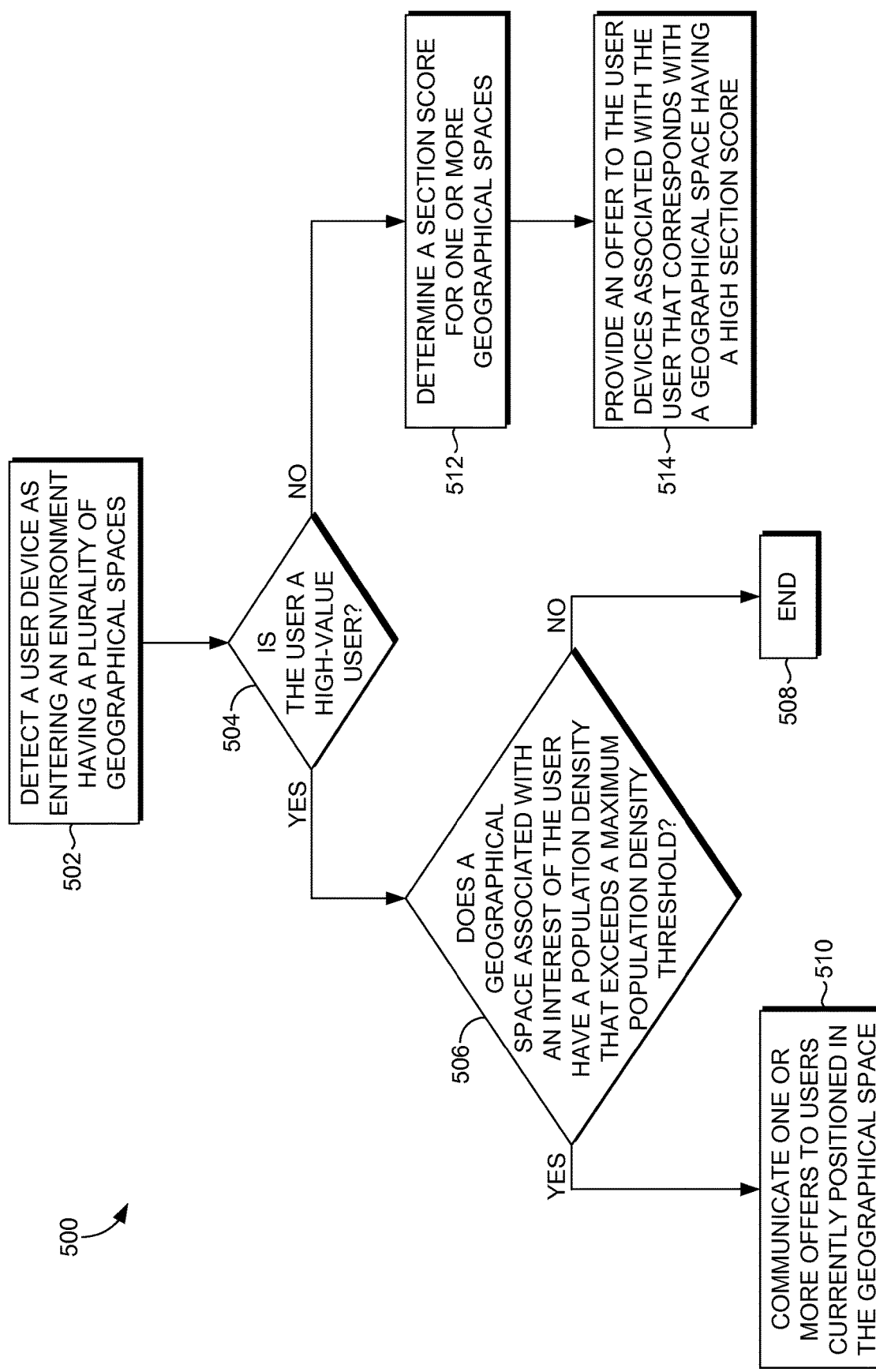

UTILIZING POPULATION DENSITY TO FACILITATE PROVIDING OFFERS

BACKGROUND

Offers, such as coupons, discounts, or sales, are oftentimes electronically provided to consumers to entice the consumer to purchase a particular item or product. For example, as a consumer enters a store, an electronic form of an offer can be provided to the consumer via a mobile device to attract the consumer to a particular product (e.g., a basketball) or a particular product section (e.g., sporting goods). Such electronic offers, however, may direct a consumer to an undesired or crowded environment.

Many individuals, however, prefer to avoid crowded locations, particularly in retail spaces. Geographical spaces, such as retail stores or retail centers, typically have periods of time during which at least a portion of the space (e.g., a retail section such as jewelry, footwear, clothing, toys, electronics, etc.) is crowded. In some cases, the crowded spaces develop by virtue of individuals incidentally being in the same place at the same time. In other cases, the crowded spaces develop based on an event or specific time period. For example, store aisles may become more crowded during the weekend, during a sale period, during a holiday time period, in the evening hours, etc. In an effort to avoid a crowded shopping area, a shopper may detour from a particularly crowded area of a store, even if it results in foregoing a particular item of interest to the shopper that is located in the crowded area. A shopper may instead navigate toward an undesired product(s) simply to avoid a crowded space.

SUMMARY

Embodiments of the present invention are directed to utilizing population density data to determine whether to provide an offer(s) to a user or a set of users. In this regard, population density is used in an effort to manage or distribute crowd in an environment by enticing users with offers. For example, an offer may provide a discount, a coupon, a sale, or the like, that may motivate a user to purchase an item or visit a particular area of a retail store that is not congested. More specifically, and by way of example only, as a user enters a store or other environment space, the user's interests (e.g., product preferences) can be compared to various areas or sections in which those interests reside. If a particular area has a high population density, an offer may be provided to the user to direct the user to another store section having a product that the user might potentially purchase or disperse other users from that section to reduce the size of the crowd.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 1 is a block diagram of an exemplary system suitable for facilitating providing offers using population density, in accordance with an embodiment of the present invention;

FIG. 2 illustrates an exemplary display of an environment having a plurality of geographical spaces, in accordance with an embodiment of the present invention;

FIG. 3 is a flow diagram illustrating a method for providing offers in accordance with population density, in accordance with an embodiment of the present invention;

FIG. 4 is a flow diagram illustrating another method for providing offers in accordance with population density, in accordance with an embodiment of the present invention;

FIG. 5 is a flow diagram illustrating another method for providing offers in accordance with population density, in accordance with an embodiment of the present invention.

DETAILED DESCRIPTION

Figure 6:
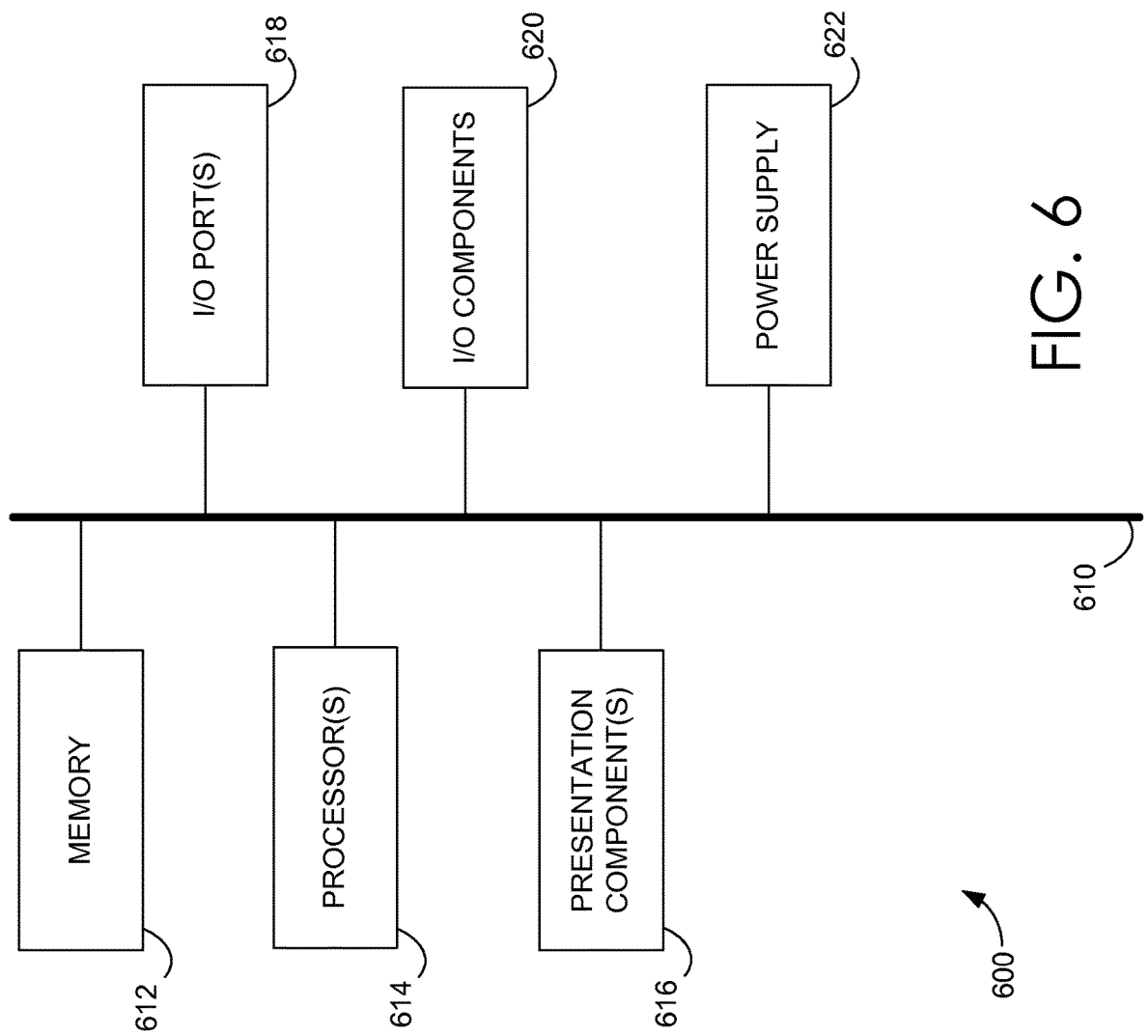
FIG. 6 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Offers, such as coupons, discounts, or sales, are oftentimes electronically provided to users to entice users to purchase a particular item or product. Conventional systems used to provide electronic offers may take into account a geographical location of a user. For example, as a consumer enters a store, an electronic form of an offer can be provided to the consumer via a mobile device to attract the consumer to a particular product (e.g., a basketball) or a particular product section (e.g., sporting goods). Such electronic offers, however, may direct a consumer to an undesired or crowded environment. In this regard, a user might be directed to a particular area of a store irrespective of the crowd distribution within the store.

Many individuals, however, prefer to avoid crowded locations, particularly in retail spaces. Geographical spaces, such as retail stores or retail centers, typically have periods of time during which at least a portion of the space (e.g., a retail section such as jewelry, footwear, clothing, toys, electronics, etc.) is crowded. In some cases, the crowded spaces develop by virtue of individuals incidentally being in the same place at the same time. In other cases, the crowded spaces develop based on an event or specific time period. For example, store aisles may become more crowded during the weekend, during a sale period, during a holiday time period, in the evening hours, etc. In an effort to avoid a crowded shopping area, a shopper may detour from a particularly crowded area of a store, even if it results in foregoing a particular item of interest to the shopper that is located in the crowded area. A shopper may instead navigate toward an undesired product(s) simply to avoid a crowded space. As such, when an offer directs a user to a crowded area, the user may disregard the offer or have an unsatisfactory user experience pursuing the offer.

Embodiments of the present invention are directed to using population density (crowd) to facilitate providing offers to users in an effort to direct users to a geographical space that is uncongested. In this regard, the population density, or crowd size, of a geographical space(s) is used to determine whether to provide an offer(s) to a user or set of users. As such, an offer might be electronically provided to a consumer to entice the consumer to a particular area that is not currently crowded. As another example, an offer might be provided to various consumers in an effort to move the consumers out of a particular area to reduce the population density such that a higher priority consumer can navigate to that area without having to contest an undesired crowd. As such, utilizing population density to facilitate providing offers can result in a satisfactory user experience as well as increased opportunities for purchase completions or other types of conversions.

At a high level, embodiments of the present invention utilize population density data and user data to determine whether to provide an offer(s) to a user or a set of users in an effort to manage or distribute crowd in an environment. An offer generally refers to any type of offer or advertisement that provides information about a person, place, or thing, such as an item, product, or service. In many cases, an offer provides some type or form of enticement in an effort to tempt a user to make a desired consideration or action. For example, an offer may provide a discount, a coupon, a sale, or the like, that may motivate a user to purchase an item or visit a particular area of a retail store. A retail store is generally referred to herein as a physical environment or space such that a user is physically moving within the store.

More particularly, and by way of example, as a user enters a store or other environment space, the user's interests (e.g., product preferences) can be compared to population density of various areas or sections in which those interests reside. Population density can be measured using any type of technology, such as beacons positioned around the store. If a particular area has a high population density (e.g., a population density that exceeds a threshold), an offer may be provided to the user to direct the user to another store section having a product that the user might potentially purchase. For example, assume that a user typically purchases jewelry and shoes, and further assume that the jewelry section is particularly crowded as the user enters the store. In such a case, the user may be presented with an electronic offer, such as a footwear discount, via the user's mobile device, to guide the user to the footwear department. In an alternative scenario, further assume that the user is a high priority user in that the user has a high likelihood of purchasing a jewelry item. A high priority user may be determined in any manner, such as a designation or a determination based on prior purchases. In such a case, rather than providing an offer to the user to guide the user to the footwear department, one or more other users currently positioned in the jewelry section might be provided with electronic offers to guide those users to other store departments and thereby reduce the crowd size in the jewelry section. For instance, each user might be provided with a temporary offer to guide him or her to another department or product in which the user is interested.

Although embodiments are generally described herein with reference to stores or shopping centers, it can be appreciated that aspects of the invention can be employed in any geographical space or environment, particularly those environments in which crowds tend to occur. For example, the technology described herein can be utilized in stadiums, hotels, airports, concert venues, sporting events, office buildings, etc.

Turning now to FIG. 1, a block diagram is illustrated that shows an exemplary computing system environment 100 suitable for use in implementing embodiments of the present invention. It will be understood and appreciated that the computing system environment 100 shown in FIG. 1 is merely an example of one suitable computing system environment and is not intended to suggest any limitation as to the scope of use or functionality of embodiments of the present invention. Neither should the computing system environment 100 be interpreted as having any dependency or requirement related to any single module/component or combination of modules/components illustrated therein.

The computing system environment 100 includes an offer manager 112, a data store 114, and user devices 116A-116N all in communication with one another via a network 110. The network 110 may include, without limitation, one or more local area networks (LANs) and/or wide area networks (WANs). Such networking environments are commonplace in offices, enterprise-wide computer networks, intranets and the Internet. Accordingly, the network 110 is not further described herein.

In some embodiments, one or more of the illustrated components/modules may be implemented as stand-alone applications. In other embodiments, one or more of the illustrated components/modules may be integrated directly into an operating system. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the offer manager 112 might reside on a server, cluster of servers, or a computing device remote from or integrated with one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 114 is configured to store information used in association with the offer manager 112, such as data collected via data collector 118. In embodiments, the data store 114 stores data associated with population density, users, and/or offers. In various embodiments, such information pertaining to population density may include maximum population density per region or area, population density per region, location of users (location data), or the like. Information pertaining to one or more users may include user identifiers, location of users, user interests, purchase probability or conversion rate, value or priority level of users, etc. Such data may be received from a user device(s) or a beacon(s) or derived (e.g., from data received from a user device(s) or a beacon(s) or other collected data). Offer data may include data used to generate offers. In embodiments, the data store 114 is configured to be searchable for one or more of the items stored in association therewith. The information stored in association with the data store 114 may be configurable and may include any information relevant to population density, users, offers, and/or the like. The content and volume of such information are not intended to limit the scope of embodiments of the present invention in any way. Further, though illustrated as a single, independent component, the data store 114 may, in fact, be a plurality of storage devices, for instance, a database cluster, portions of which may reside on the offer manager 112, user devices 116A-116N, and/or any combination thereof.

The user devices 116A-116N (generally referred to as user device 116) may be any type of device suitable for facilitating providing offers. Such computing devices may include, without limitation, a computer, such as, for example, computing device 600 described below with reference to FIG. 6. User devices may include tablet PCs, PDAs, mobile phones, smart phones, as well as conventional display devices such as televisions, or any Internet of Things devices (e.g., game consoles, kiosks, appliances, etc.). A user, as used herein, refers to an individual or entity that operates a user device. Generally, a user device is used to facilitate identifying a location of the user and/or presenting an offer to the user.

In some embodiments, the user device 116 can facilitate providing location data, for instance, to the offer manager 112. To this end, location data may be captured by the user device and provided along with or in addition to other data provided to the offer manager 112, or other component. Any technology can be used to obtain and provide location data and is not intended to limit the scope of embodiments of the present invention.

For example, in some implementations, user devices can communicate with beacons to facilitate identification of location data. For instance, beacons distributed throughout a retail store may use Bluetooth® technology to detect and communicate with nearby user devices as the user device approaches a beacon, as described in more detail below. In some embodiments, a user device may have an application installed on the user device, such as a retailer application, a multi-retailer application (e.g., Shopkick), or any other application that might interact with beacons disbursed in retail store locations. An operating system (OS) of a user device might additionally or alternatively detect or identify beacon signals transmitted from beacons. An application or OS on a user device can receive or detect a nearest beacon signal placed in a location or section of the retail store. As can be appreciated, in some cases, a mobile application can receive a beacon signal even when the application is operating in a background state. For instance, in the event an application is not actively running, a mobile operating system can launch the application automatically in the background if a nearby beacon of interest is detected. In some cases, the application may register an identification of beacons in which it is interested (e.g., UUIDs) with the operating system and/or a specified distance range with the beacons of interest.

Beacons generally use Bluetooth Low Energy (BLE) to transmit data over short distances. BLE communication generally includes advertisements of packets of data that are broadcast at regular intervals through radio waves. The packets of data can then be detected by smart devices nearby, which can be used to trigger events (e.g., prompts, push notifications, and application actions). An advertising packet can include various components of data that can be used to identify the transmitting beacon and location of user device relative to the beacon. For example, an advertising packet can include a universally unique identifier (UUID) (e.g., a 16 byte string format that distinguishes an entity's beacons from others), a major value (e.g., a 2 byte string used to specify a beacon within a group), a minor value (e.g., a 2 byte string used to identify specific beacons), and a proximity value (e.g., provides signal strength to indicate proximity relative to the beacon). The UUID, major value, and minor value can together form an identifier used to identify the particular beacon being communicated with. To this end, the user device can recognize which beacon is nearby on the basis of these values. Another byte in the packet indicating location (proximity value) can be used to determine distance from the beacon. A proximity value can be represented by a RSSI value (Received Signal Strength Indication) measured relative to the Beacon.

Upon detecting or receiving an advertising packet broadcast from a nearby beacon, the user device can provide the data to the offer manager 112 (or other component) and/or use the data to derive location data. For example, the user device can determine the nearby beacon based on the beacon identifier contained in the advertising packet as well as the relative proximity to the beacon using the proximity value. In this regard, the user device can determine an extent or range a distance range near the beacon, such as immediate distance (e.g., within a few centimeters), near (e.g., within a couple of meters), or far (e.g., greater than 10 meters). As can be appreciated, any distance metrics and/or distance ranges can be used to represent proximity to a nearby beacon as location data. As such, the user device can be used to approximate when a user has entered, exited, or lingered in a region. Depending on the customer's proximity to a beacon, the user may receive different levels of interaction at each of the different levels of proximity. In this regard, upon identifying the UUID, major number, minor number, and proximity value, a given application can decide whether to act or not.

Although beacon technology is generally discussed herein, as can be appreciated, any other technology can be utilized to obtain location data. For example, near field communication (NFC) technology, mobile micro geo location technology, etc. can be used. As another example, GPS technology or Wi-Fi technology deployed on a user device can be used to detect location data. Any technology can be used to obtain location data and such technology is not intended to limit the scope of embodiments of the present invention.

Location data detected or obtained at the user device 116 can be provided to the offer manager 112. As can be appreciated, location data can be communicated in any format and at any time. For example, location data might be provided as an actual position location (e.g., using GPS data) or a distance from a beacon (e.g., distance value or distance range). Further, location data might be communicated immediately after detected or collected and periodically communicated.

In communicating with the offer manager 112, the user device can provide a user device identifier such that the user device, or user thereof, can be recognized. In some cases, a subscriber ID method is used. A subscriber ID method uses any number of HTTP subscriber ID headers that uniquely identify a mobile device. The headers often include the device phone number (or a hashed version of the number) or other identifiers. The headers contain information on device ID, client ID, calling line ID, etc. Such information can be used to identify the user and his or her interests.

As described, a user device can be used to facilitate presenting an offer to the user. For example, upon offer manager 112 selecting an offer and providing the offer to the user device 116 as described in more detail below, the user device can present the offer to the user. As shown, the user devices 116A-116N include display screens 117A-117N (generally referred to as display screen 117). The display screen 117 is configured to display information to the user of the user device 116, for instance, information relevant to communications initiated by and/or received by the user device 116, information concerning offers, and/or the like.

In embodiments, the user device 116 receives an offer(s), for example, provided by the offer manager 112, and presents the offer(s) via a display screen of the user device. An offer can be in any form, such as a push notification via an application or a targeted experience via a webpage such as a landing page. In this regard, in accordance with an offer manager, or other component, providing or transmitting offer data to the user device 116, the user device can present an offer on a display screen via a push notification (e.g., through an application running on the device) or a webpage (e.g., through a web browser or browser application running on the device). For instance, when a user enters a store, a push notification of a personalized offer related to men's apparel may be sent to the user device (e.g., based on user interest). When the user is in the men's apparel section and opens a retailer application, the landing page of the application may show images of some apparel items from the men's section.

In some implementations, the various states of an application running on the user device can designate how offers are provided to the user. For example, when an application is running (an active state state), an offer can be presented to the user via an in-application messages. By contrast, when the application is running in the background (background state), an offer can be presented to the user via a push notification.

Turning to the offer manager 112, the offer manager 112 shown in FIG. 1 may be any type of computing device, such as, for example, computing device 600 described below with reference to FIG. 6. By way of example only and not limitation, the offer manager 112 may be a personal computer, desktop computer, laptop computer, handheld device, mobile handset, consumer electronic device, a server, a cluster of servers, or the like. It should be noted, however, that embodiments are not limited to implementation on such computing devices, but may be implemented on any of a variety of different types of computing devices within the scope of embodiments hereof.

Components of the offer manager 112 may include, without limitation, a processing unit, internal system memory, and a suitable system bus for coupling various system components, including one or more data stores for storing information (e.g., files and metadata associated therewith). The offer manager 112 typically includes, or has access to, a variety of computer-readable media. By way of example, and not limitation, computer-readable media may include computer-storage media and communication media. The computing system environment 100 is merely exemplary. While the offer manager 112 is illustrated as a single unit, one skilled in the art will appreciate that the offer manager 112 is scalable. For example, the offer manager 112 may in actuality include a plurality of computing devices in communication with one another. Moreover, the data store 114, or portions thereof, may be included within, for instance, the offer manager 112, a third-party service as a computer-storage medium, etc. The single unit depictions are meant for clarity, not to limit the scope of embodiments in any form.

As shown in FIG. 1, the offer manager 112 comprises data collector 118, an offer analyzer 120, and an offer generator 122. In some embodiments, one or more of the components 118, 120, and 122 may be implemented as stand-alone applications. In other embodiments, one or more of the components 118, 120, and 122 may be integrated directly into the operating system of a computing device such as the computing device 600 of FIG. 6. It will be understood by those of ordinary skill in the art that the components 118, 120, and 122 illustrated in FIG. 1 are exemplary in nature and in number and should not be construed as limiting. Any number of components may be employed to achieve the desired functionality within the scope of embodiments hereof.

The data collector 118 is configured to obtain or collect data (e.g., via the network 110) for use in determining whether to provide offers to users. In embodiments, the data collector 118 obtains population density data, user data, and offer data. Although various types of data are described herein, in some implementations, it can be appreciated that additional data may be obtained and/or some data might not be obtained. The data described herein as being obtained are exemplary in nature and not intended to limit the scope of embodiments of the present invention. Further, the data can be provided from any number or type of devices, some examples of which are described herein.

Population density data refers to any data associated with population density of an area or geographical space. Population density data can be obtained or collected from any number of devices, such as user devices 116A-116N or marketer devices (not shown). A marketer device refers to a device used by a marketer or entity associated with providing an offer or a geographical space. In various embodiments, such information pertaining to population density may include location data, population density, maximum population density, or the like.

Location data generally refers to any data that indicates location of the user device. In some cases, location data can indicate a geographic location, a location relative to a point of reference, such as a beacon, store section, recommended item, or the like. Location data may be in any number of forms, such as precise location value or a location range (e.g., short distance, 0-5 meters, etc.). As described above, location data can be received from any number of user devices. In this regard, user devices within range of beacons can provide location data detected in accordance with beacon signals to the offer manager. In other examples, GPS or wireless data associated with the user device can be used to provide location data to the offer manager. In an alternative or additional embodiment, location data might be transmitted by another component, such as directly from a beacon itself or an intermediary component.

Population density refers to density of individuals in an area or geographical space. Population density can be represented in any number of formats, such as a number of individuals per geographical space (e.g., store section), a level of density (e.g., low, medium, high), etc. To determine population density or crowd size, collected location data can be aggregated and analyzed. In this regard, a number of individuals indicated as being located within a particular geographical space can be identified. In some implementations, a population density is determined for various sections or areas of a store. As can be appreciated, population density can be computed in real time as users move around an environment, such as from one store section to another store section.

A maximum population density refers to a density that is deemed to be a maximum or optimal density for a particular geographical space. For example, assume that a more than 15 individuals in the jewelry section is too crowded. In such a case, a marketer may designate 15 as the maximum population density desired for the jewelry section. As another example, a maximum population density for a geographical space associated with a particular beacon might be designated as 20 users. A maximum population density might be provided in any number of manners. In one embodiment, a marketer or developer of an application or associated with a geographical space may indicate or designate a desired maximum population density for the space. In another embodiment, a maximum population density can be automatically learned via machine learning. For instance, customers' purchase behaviors may be tracked to identify an optimal level of customers for each section. A percentage of converted customers may be tracked for various population densities over a period of time. If a significant decrease in the conversion percentage is identified after a particular density, such a density can be designated as the optimal value for that particular section.

In some cases, population density might also include data associated with users in a particular geographical space. For instance, priority levels associated with users within a particular geographical space can be identified and collected. In a particular example, an area with twenty users might include 18 users with a medium priority and 2 users with a high priority.

As can be appreciated, the data collector 118 can collect such population density data. For example, Table 1 below provides an example of data collected in connection with population density.

TABLE 1

Exemplary Set of Population Density Data

| Section | Maximum Number of Customers that should be present in the section | Number of Customers Present in the Section | Number of Premium/ Average/Low Value Customers |
|---|---|---|---|
| Sporting Goods | 25 | 17 | Premium: 4 Customers Average: 10 Customers Low: 3 Customers |
| Electronics | 15 | 21 | Premium: 4 Customers Average: 10 Customers Low: 3 Customers |

User data refers to any data associated with users. User data can be obtained or collected from any number of devices, such as user devices 116A-116N or marketer devices (not shown). In various embodiments, such information pertaining to users may include a user identifier, location data, user interest data (a set of user interests), a purchase or conversion indicator, an indication of user value, or the like.

A user identifier may be any identifier that identifies a user or a user device. For example, as previously described, in some cases, a subscriber ID method is used. A subscriber ID method uses any number of HTTP subscriber ID headers that uniquely identify a mobile device. The headers often include the device phone number (or a hashed version of the number) or other identifiers. The headers contain information on device ID, client ID, calling line ID, etc. As described in more detail below, such information can be used to identify the user and his tor her interests. Location data generally refers to any data that indicates location of the user device, or user associated therewith.

User interest data refers to any data associated with an interest to a user. User interest data might indicate an interest of a user or other information relevant to user interests. For example, user interest data might refer to a particular item or product, a particular section or department (e.g., jewelry section), a particular store, a particular time of day, a particular day of week, or the like.

A conversion indicator may be a probability or other indication association with a likelihood a user will complete a purchase or other type of conversion. A conversion indicator may be represented in any format, such as a probability, a level of likelihood, or the like. Further, a user may be associated with any number of conversion indicators. For example, a user may have an overall conversion indicator, a conversion indicator associated with each product or item of interest to the user, a conversion indicator associated with predetermined products or items (e.g., specified by a marketer), and/or the like.

A value indicator refers to any indication of a value or priority of the user. In this regard, a user may generally be designated as a high-value user if the user completes a particular number (threshold) of purchases, or spends a particular amount of money with respect to a product, store, store department, or other entity or item.

As can be appreciated, the data collector 118 can collect such user data. For example, Table 2 below provides an example of data collected in connection with population density.

TABLE 2

Exemplary Set of Population User Data

| Customer ID | Customer Interest | Customer Location | Customer Purchase Probability |
|---|---|---|---|
| 1 | Sports - Cycling | Entrance A | High (7/10) |
|  | Electronics - Computers |  | High (7/10) |
| 2 | Furniture - Bedroom | Entrance C | High (6/10) |
| 3 (Premium Customer) | Electronics - Phone | Entrance B | High (9/10) |

Offer data can also be collected by the data collector 118. Offer data refers to any data associated with an offer. Offer data can be obtained or collected from any number of devices, such as user devices 116A-116N or marketer devices (not shown). In various embodiments, offer data may include the offer, or information associated therewith, parameters associated with an offer (offer parameter), or the like. Parameters associated with an offer may indicate when, how, frequency, location, or other preferences for providing offers. For instance, an offer parameter may be a maximum discount that can be given on a particular product. Such information may be provided, for example, by a marketer for each product, each product section, a group of products, or the like. Other examples of offer data may include a maximum number of offers that may be provided in a certain time period or certain location.

Although the offer collector 118 is described herein as collecting data, various aspects of the data may be collected by other components. For example, offer data may be collected at a marketer computing device and referenced therefrom when needed.

The offer analyzer 120 is generally configured to determine whether to provide an offer or set of offers. In this regard, the offer analyzer 120 analyzes data to determine if an offer is to be provided. As described in more detail below, the offer analyzer 120 can use population density data, user data, and/or offer data to determine whether to provide an offer. To this end, offers can be provided to users in accordance with crowd size in various geographical spaces to direct users to particular areas that are not crowded or away from particular areas that are crowded.

As such, in embodiments and at a high level, the population density associated with a geographical space or set of geographical spaces is compared to the maximum population density associated with the corresponding geographical space(s) to determine whether the density capacity or maximum population density is met or exceeded. In some implementations, when population density exceeds the designated capacity, a user might be provided with an offer to direct him or her to another area (e.g., section in a store) or multiple users might be provided with offers to direct users out of an area to reduce the crowd in a highly populated section.

In addition to assessing population density within geographical spaces, the offer analyzer 120 can evaluate additional data to determine whether to provide an offer(s) to an individual or set of individuals. For example, interests of users, distance of user to sections, and user values may be assessed to identify whether to provide an offer(s) to a user or set of users. Various weights can be specified or determined for various data used to determine whether to provide an offer(s). For instance, assume that distance, population density, and user interest are used to determine whether to provide an offer to a user or set of users. In such a case, a marketer may specify weights for each parameter. As another example, parameter weights can be generated or refined using machine learning or assigned a default value. Various examples are set forth below of methods that may be employed in implementing embodiments or the present invention. As can be appreciated, other implementations not explicitly described herein are contemplated within the scope of embodiments herein.

In some embodiments, the offer analyzer 120 determines whether to provide an offer based on population density of a geographical area in which a user has an interest (e.g., product interest). In some cases, when a geographical area in which a user has an interest has a low population density (i.e., is not crowded), the offer analyzer 120 may determine to provide an offer related to that geographical area to direct the user to that area. Alternatively, the offer analyzer 120 may determine that an offer is not to be provided and, instead, the user is permitted to move on his or her own to the particular area. When a geographical area in which a user has an interest has a high population density (e.g., is crowded), the offer analyzer 120 may determine to provide an offer related to another geographical area in which the user is interested (e.g., a secondary interest). Alternatively, the offer analyzer 120 may determine to provide an offer(s) to other users in that desired geographical area in an effort to direct those users to other areas such that the user can move to the desired geographical area without having to navigate through a crowd of users.

As an example, for each geographical space, such as sections within a store, a space score can be calculated in association with a user. A space score indicates a score associated with the geographical space for the user. In this regard, for every section $S\_j$ (e.g., in a store), a score $S\_S\_j$ is calculated using the following equation:

$$S\_S\_j = W1*(Max\_C\_S\_j - C\_C\_S\_j) + W2*(D\_L\_C\_i\_S\_j) + W3*(I\_C\_i\_S\_j),$$

wherein $Max\_C\_S)j$ is the maximum number of customers that should be present in section $S\_j$, $C\_C\_S\_j$ is the current number of customers that are already present in section $S\_j$, $D\_L\_C\_i\_S\_j$ is the distance of section $S\_j$ from the current location of customer $C\_i$, and $I\_C\_i\_S\_j$ is the interest of customer $C\_i$ in the products at section $S\_j$ as determined using user data. Such weights (W1, W2, W3) can be designated by a marketer or machine learned. For various customers, the weights might be modified on the basis of corresponding conversion rates of the customers that are routed to sections which are different from the sections of their maximum interest. Upon identifying a set of space scores for the various sections, the sections can be sorted based on their corresponding scores.

If the section that has the maximum score ($Max\_S\_S\_j$) corresponds to the section of maximum interest to the customer $C\_i$ and has not been visited by the customer in the current session in the store, the customer might not be provided with an offer such that the customer is permitted to move as per his or her discretion. On the other hand, if the section $Max\_S\_S\_j$ that has the maximum score does not correspond to the section that is of maximum interest to the customer $C\_i$, an offer may be sent to the customer $C\_i$, for example, for a product in section $Max\_S\_S\_j$. In some cases, a discount for a product might be proportional to the number of customers in the section that is of maximum interest to $C\_i$ subject to the maximum discount that is specified by the marketer. As can be appreciated, scores can be calculated using any number or type of variables. For example, in some cases, a score may be calculated based on population density and user interests and corresponding weights.

In some cases, a user value or priority may be considered in determining whether to provide an offer. For example, in the case that a customer is a premium or high valued customer, a section $S\_C\_i$ that is of maximum interest to the user can be identified. If the section $S\_C\_i$ identified as maximum interest to the user can accommodate more customers (i.e., the population density is not at capacity), an offer can be provided to the user to direct the user to that section or, alternatively, no offer may be provided permitting the user to navigate to the section without incurring a crowd. On the other hand, if the section $S\_C\_i$ identified as maximum interest to the user cannot accommodate more customers (i.e., is at or over capacity), an offer(s) can be provided to users currently located in that section to deviate the users to other geographical spaces. For example, the customers presently located in that section might be sorted on the basis of their value (e.g., premium/average/low). Customers associated with a lower value might be provided an offer associated with another geographical space in an effort to move the users to those areas. As another example, customers with a high interest in another space may be provided with an offer to move the customers. As can be appreciated, the specific offer provided to users to move them to another location might be based on interest of the users, location of the users, etc. For instance, for each user, a determination may be made as to a high interest of the user such that the user is provided with an offer related to that interest. Further, a time-based offer might be provided to motivate the user to move within the near future in an effort to alleviate the crowd currently located in that section.

As can be appreciated, the offer analyzer 120 may analyze whether to provide an offer or set of offers at any time. In some cases, the offer analyzer 120 may perform an analysis for each user periodically or continually. In other cases, the offer analyzer 120 may perform an analysis in accordance with an occurrence of an event. That is, in accordance with detecting an occurrence of an event, offer analysis may be triggered. For example, embodiments of the above described offer analysis may occur when a user enters a store, enters a product section, or the like. Such event triggers may be detected using any technology, such as, for instance, GPS, beacons, Wi-Fi technology, user interactions with a mobile device (e.g., activation of an application) or the like.

The offer provider 122 is generally configured to provide offers. In accordance with the offer analyzer 120 determining to provide an offer to a user or set of users, the offer provider 122 can provide the offer or set of offers, or data associated therewith. In some cases, the offer provider 122 can reference an offer to be provided. In other cases, the offer provider 122 may generate the offer for providing to a user(s). For example, in accordance with determining that an offer is to be provided to direct a user to a particular geographical space, an offer associated with that geographical space, or product of interest, may be generated or selected to provide to the user. In some cases, the offer amount may be selected or altered to coordinate a desired level to move a user to a particular area. For instance, in the event it is strongly desired to move or direct a user to a particular area, an offer with a large discount amount may be communicated to the user. In the instance that it would be beneficial, but not necessary, to move a user to a particular area, a small discount amount may be communicated to the user. A determination of an offer amount or level might be based on any number of factors, such as distance to a user, size of crowd or population density, value of a customer, conversion rate of a customer, or the like. Additionally or alternatively, offers may be associated with a time limitation to entice to the user to move in a relative time period. For example, an offer may be provided that expires if not utilized within 30 minutes. Further, an offer may be capped based on a maximum offer, for example, provided by a marketer.

Turning to FIG. 2, FIG. 2 provides an example of using population density to provide offers. For simplicity, FIG. 2 illustrates sections with a store and location of some users, but does not illustrate all users in the store. Assume that a data collector, such as data collector 118, collects data related to population density, user data, and offer data. As such, and as illustrated in FIG. 2, table 202 and table 204 represent data associated with users located within a store represented as store 206. Table 202 includes data related to population density including section identifiers 210, current number of customers 212, number of low purchase probability customers 214, and additional number of customers that can be accommodated in a section 216. Such data can be collected and modified in an ongoing basis as users move around the store. As described above, location data associated with user movement can be detected in any number of manners, such as beacons positioned in the store.

Table 204 includes data related to users or customers located within the store. In this example, table 204 includes a customer identifier 220, customer interests 222, customer location 224, customer purchase probability 226, and section accommodation status 228. Such data can be collected and modified in an ongoing basis. For example, as a customer moves from one section to another section within the store, the current customer location can be updated. Further, as another example, as a customer purchase probability or section accommodation status changes, the data stored within table 204 can be modified to reflect the updated information.

Assume that user 230 (having customer identifier value of "1" as indicated in Table 204) enters the store at entrance A. Upon detecting the user being positioned at Entrance A, the population densities in the store sections associated with the user interests of sports/cycling and electronic/computers can be referenced. In this example, the section accommodation status for sports/cycling section is red as the section is already at capacity, and the section accommodation status for electronics/computers section is green as the section can accommodate a number of additional customers. As such, embodiments of the invention may communicate an offer to user 230 that is related to the electronics/computers section in an effort to move the customer to that section. As can be appreciated, in some cases, whether to provide an offer or an extent of an offer might be based on the purchase probability associated with the user for that section. In this example, the customer purchase probability is high with regard to electronic/computers. As such, the offer may be customized based on the likelihood that the user will purchase an item from the electronic/computers section.

As another example, assume that customer 232 (having customer identifier value of "2" as indicated in Table 204) enters the store at entrance C. In such a case, a determination as to whether to provide an offer to customer 232 may be based on the customer interest and accommodation status. Because the indicated customer interest is furniture/bedroom (as indicated in Table 204), and the section is able to accommodate additional customers (as indicated in Table 204), it may be determined to not provide an offer and permit the user to proceed to that section. Alternatively, an offer may be provided to entice the user to that section.

Assume that customer 234 (having customer identifier value of "3" as indicated in Table 204) enters the store at entrance B. Upon entering the store, it might be detected that customer 234 is a premium valued customer. In accordance with the customer having an interest in electronics/phone (as indicated in Table 204), the section accommodation status for that section is recognized as red indicating that additional customers cannot be accommodated in that section. In this case, because the customer is a premium customer with a high probability to purchase an item associated with the electronics/phone section, it may be determined to provide offers to other users in that section to disseminate the crowd currently positioned in that section. For instance, offers may be sent to low purchase probability customers 236 and 238 present in the electronics/phone section so that there is space for the premium customer 234 when he or she reaches the corresponding section. Such offers may have a time limitation in an effort to immediately disburse the other customers 236 and 238. In some cases, an offer may be provided to the premium customer 234, or the customer 234 may not be provided with an offer and simply allowed to move to that section.

To recapitulate, embodiments of the invention include systems, machines, media, methods, techniques, processes and options for facilitating provider offers based on population density. Turning to FIG. 3, a flow diagram is illustrated that shows an exemplary method 300 for providing offers in accordance with population density, according to embodiments of the present invention. The method 300 might be performed, for example, by offer manager 112 in FIG. 1. In some embodiments, aspects of embodiments of the illustrative method 300 can be stored on computer-readable media as computer-executable instructions, which are executed by a process in a computing device, thereby causing the computing device to implement aspects of the method 300. The same is, of course true, with the illustrative method 400 depicted in FIG. 4, method 500 depicted in FIG. 5, or any other embodiment, variation, or combination of these methods.

Initially, as indicated at block 302, a population density is determined for a geographical space. Population density can be determined for any number of geographical spaces. In some cases, a population density is determined for each geographical space, for instance, within a store. In other cases, a population density is determined for a particular set of one or more spaces. For instance, population density might be determined for a geographical space in which a user is located, geographical spaces having items of interest to a user, or the like.

At block 304, the population density associated with the geographical space is used to determine to provide an electronic offer to a user. Generally, the electronic offer to be provided to the user is associated with an item in the geographical space to entice the user to move to the geographical space. In some cases, the electronic offer is associated with a space having an item of interest that is not heavily populated in an effort to move the user to such a space. Thereafter, at block 306, an electronic offer is provided for viewing by the user. For instance, the electronic offer, or data associated therewith, is transmitted to the user device operated by the user such that the user can view the offer via a push notification, an application, or a webpage.

With reference now to FIG. 4, a flow diagram is illustrated that shows an exemplary method 400 for providing offers in accordance with population density, according to embodiments of the present invention. The method 400 might be performed, for example, by offer manager 112 in FIG. 1. Initially, as indicated at block 402, a user interest associated with a geographical space is identified. A user interest may be referenced from a data set that collects user data indicating user interests. At block 404, a population density for a geographical space associated with a user interest is determined. Such a population density can be determined using any number of technologies. For example, beacon signals can be transmitted and detected by mobile devices located near the geographical space. At block 406, based on the user interest and the population density associated with the geographical space, offer data is provided to a user device associated with the user, the offer data intended to entice the user to the geographical space associated with the user interest. In some cases, the offer data may be intended to move a user to a geographical space of interest that is not currently crowded.

Turning now to FIG. 5, a flow diagram is illustrated that shows an exemplary method 500 for providing offers in accordance with population density, according to embodiments of the present invention. The method 500 might be performed, for example, by offer manager 112 in FIG. 1. Initially, as indicated at block 502, a user device is detected as entering an environment having a plurality of geographical spaces (e.g., store sections). At block 504, it is determined whether the user is designated as a high-value user. In embodiments, a high-value user may be designated for users that have a high conversion rate. If the user is a high-value user, it is determined whether a geographical space associated with an interest of the user has a population density that exceeds a maximum population density threshold, as indicated at block 506. In this regard, it is determined whether an area the user is likely to navigate to is crowded or congested. If the geographical space can accommodate additional users, the method ends, as indicated at block 508. Alternatively, the user may be provided with an offer to entice the user to move to that area, for example, an offer for a product in that area. On the other hand, if the geographical space cannot accommodate additional users, at block 510, one or more offers are communicated to users currently positioned in that geographical space in an effort to decongest the space for the high-value user. In some cases, the users currently positioned in the geographical space to receive an offer might be selected based on the value or priority of the user, interests of the users, or the like. The offers provided to users may be time-based offers to motivate the users to move to other geographical spaces in the immediate to near future.

Returning to block 504, if the user is determined not to be a high-value user, at block 512, a section score for various geographical spaces is determined. The section score can be based on the population density of the geographical space, the user interest associated with the geographical space, and/or the distance of the user to the geographical space. As can be appreciated, the factors used to determine the section scores for the various geographical spaces can be weighted. At block 514, an offer can be provided to the user device associated with the user that corresponds with a geographical space having a greatest or a high section score. As such, the user can be enticed to proceed to an area in which the user is interested and that is not presently congested. In some cases, rather than providing an offer, the user may be permitted to move to an area of interest, for example, when the area is determined to be uncongested or able to accommodate additional users.

Having described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, spatial visualization of metrics. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for facilitating providing offers utilizing population densities, the method comprising:
   determining location data based on locations of a plurality of user devices relative to one or more beacons positioned in a retail environment;
   determining, in real time, a population density for a geographical space in the retail environment by analyzing the location data;
   determining values that indicate priorities of users located in the geographical space based on a purchase probability of the users for items associated with the geographical space;
   using the population density and the values associated with the geographical space to determine a personalized electronic offer for a user, using an offer analyzer component, the personalized electronic offer being associated with an item present in a second geographical space in the retail environment to entice the user to move from the geographical space to the second geographical space; and
   providing, using an offer generator component, the personalized electronic offer for viewing by the user via a user device.

2. The method of claim 1, wherein the geographical space is an area in which the user is located or an area in which the user is interested.

3. The method of claim 1, wherein the second geographical space to which to entice the user to move is based on a distance of the user from the second geographical space.

4. The method of claim 1, wherein the determination to provide the personalized electronic offer to the user is based on a comparison of the population density associated with the geographical space to a maximum population density desired for the geographical space.

5. The method of claim 1, wherein the determination to provide the personalized electronic offer to the user is further based on a user interest in the item in the geographical space.

6. The method of claim 1, wherein the personalized electronic offer being associated with the item in the geographical space is intended to move the user to the second geographical space that is of interest to the user and is currently uncongested.

7. The method of claim 1, wherein the personalized electronic offer being associated with the item in the second geographical space is intended to move the user to the second geographical space that is different from the geographical space in which the user is located.

8. The method of claim 1, wherein the personalized electronic offer comprises a temporary offer that is set to expire after a predefined time.

9. The method of claim 1, wherein the personalized electronic offer is determined using specified weights for distance, the population density, and user interest.

10. One or more computer-readable storage media having embodied thereon computer-executable instructions that, when executed by a processor in a computing device, cause the computing device to perform a method for facilitating providing offers utilizing population densities, the method comprising:
    identifying, using an offer analyzer component, a user interest of a user, the user interest being associated with a geographical space;
    determining location data based on locations of a plurality of user devices relative to one or more beacons;
    determining a population density for the geographical space associated with the user interest by analyzing the location data;
    based on the user interest, the population density, and a value associated with the geographical space, providing, using an offer generator component, personalized offer data to a user device associated with the user, the personalized offer data intended to entice the user to the geographical space in the retail environment associated with the user interest.

11. The media of claim 10, wherein the user interest comprises an indication of the geographical space.

12. The media of claim 10, wherein the user interest comprises an item located within the geographical space.

13. The media of claim 10, wherein the population density is determined based on location data received from a plurality of mobile devices positioned near the geographical space.

14. The media of claim 10, wherein a determination to provide the personalized offer data to the user device is initiated when a user enters or approaches the geographical space.

15. The media of claim 10, wherein a determination to provide the personalized offer data to the user device is initiated when a first geographical space in which the user is currently located is determined to have a high population density.

16. The media of claim 15, wherein the high population density is determined based on a first population density associated with the first geographical space exceeding a maximum population density threshold.

17. One or more computer-readable storage media having embodied thereon computer-executable instructions that, when executed by a processor in a computing device, cause the computing device to perform a method for facilitating providing offers utilizing population densities, the method comprising:
    determining, using an offer manager component, values for users of a plurality of user devices that indicate a priority of the users for one or more geographical spaces in a retail environments based on a purchase probability of the users for items associated with each of the geographical spaces;
    identifying that a user is a high-valued user using the values;
    identifying a geographical space that is of maximum interest to the user;
    determining location data based on locations of a plurality of user devices relative to one or more beacons positioned in an environment containing the geographic space;
    determining, in real time using an offer analyzer component, that a current population density associated with the geographical space exceeds a maximum population density corresponding with that geographical space, the current population density based on an analysis of the location data; and
    based on the current population density exceeding a maximum population density, providing, using an offer generator component, one or more offers to one or more user devices associated with one or more users currently located in the geographical space in the retail environment that are not identified as high-valued users.

18. The media of claim 17, wherein the one or more offers provided to the one or more user devices correspond with interests of the one or more users currently located in the geographical space.

19. The media of claim 17, wherein the one or more offers provided to the one or more user devices are time-based offers that are set to expire after a predefined duration of time.

20. The media of claim 17 further comprising providing an offer to the user for an item within the geographical space.

* * * * *